Feb. 10, 1970  R. J. BAUGHMAN ET AL  3,494,743
VAPOR PHASE REACTOR FOR PRODUCING MULTICOMPONENT COMPOUNDS
Filed Nov. 1, 1967
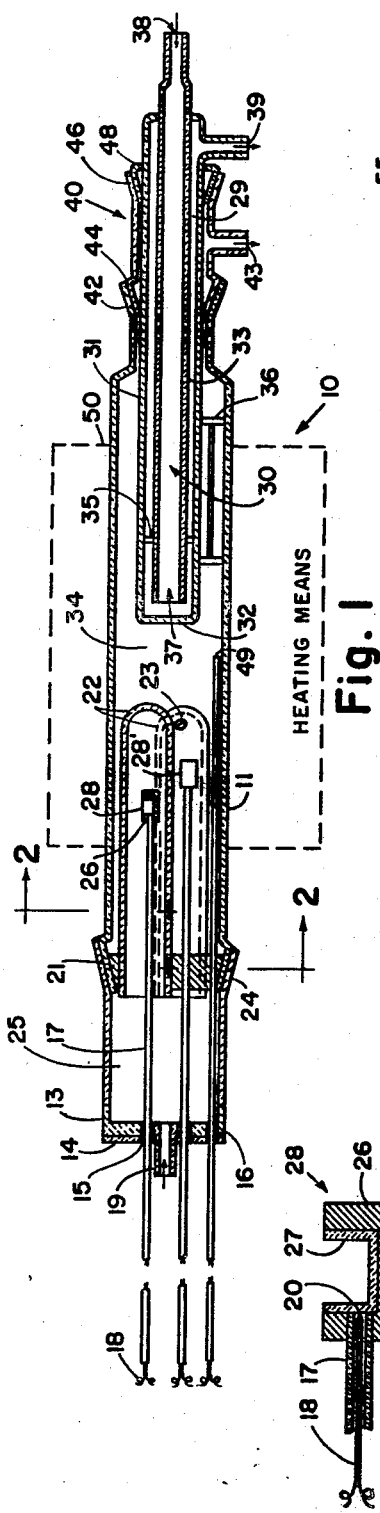
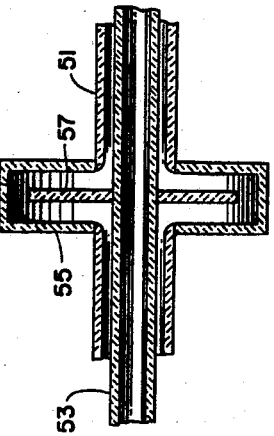
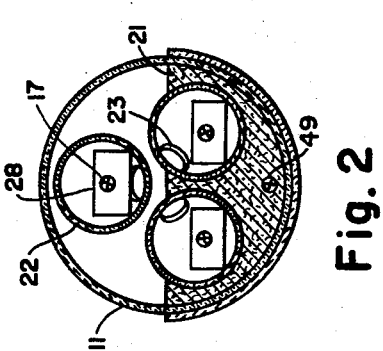
Richard J. Baughman
James A. Corll
INVENTORS
BY

United States Patent Office 3,494,743
Patented Feb. 10, 1970

3,494,743
VAPOR PHASE REACTOR FOR PRODUCING MULTICOMPONENT COMPOUNDS
Richard J. Baughman and James A. Corll, Albuquerque, N. Mex., assignors to the United States of America as represented by the United States Atomic Energy Commission
Filed Nov. 1, 1967, Ser. No. 679,827
Int. Cl. H01l 7/36; B01j 1/14; C23c 13/08
U.S. Cl. 23—284           9 Claims

ABSTRACT OF THE DISCLOSURE

A vapor phase device or reactor for combining normally solid reactants comprising reactant containing crucibles surrounded by a temperature equalizing heat reservoir and equipped with temperature sensing means, multiple vapor compartments each containing at least one of said crucibles, a heat source for vaporizing the solid reactants, a condensation probe for solidifying reaction products, and an atmospheric protection housing or tube enclosing at least a portion of said condensation probe and said vapor compartments.

BACKGOUND OF INVENTION

Production of solid state electronic components such as semiconductors require formulation of various compounds and mixtures which in the past have been manufactured with a variety of methods and apparatus.

Vapor phase reactions have been used for production of binary compounds from reactants normally existing in the vapor or liquid phase and having boiling points below or near ambient temperature. No special high temperature apparatus is needed for such reactions as is required for vapor phase reaction of high boiling mateials.

Compounds prepared from high boiling and melting point, or normally solid reactants, such as metals have been prepared in aqueous or organic solutions. Where the reaction requires a high activation temperature, the solvent may be vaporized or the extreme pressure required to prevent solvent loss may be prohibitive. Some reactions may have activation temperatures in excess of the critical temperatures of suitable solvents, and therefore cannot be maintained in solution. Even if the reaction can be carried out in solution, there remains the problem of separating reaction products from the solvent.

Powdered metals have been reacted with gases by initiating the reaction with a detonation producing a shock wave in a high temperature environment. The finely powdered metal is entrained within a gas stream composed of or containing other desired reactants. The gas phase reactants diffuses through and reacts with the molten metal at the particle surface. If the powdered particle is not completely molten the reaction will be incomplete. Sufficient gas must be utilized to entrain the metal particle which may be in excess of stoichiometrically efficient proportions. Moreover, two or more powders could not be effectively reacted together by this process because of the difficulty in providing sufficient communication between particles.

Molten metals can be reacted with other liquids but the melting points and temperatures of the reactants should be in about the same range to avoid vaporizing one reactant from heat concentrated in the other. Exothermic reaction may be uncontrollable in the liquid phase where reactants are concentrated. Moreover, compounds such as some of the reaction products of cadmium, tellurium, and selenium cannot be readily prepared at temperatures obtainable in the molten liquid phase.

Multicomponent compounds requiring more than two reactants are especially difficult to produce even by vapor phase reactions as simultaneous multi-body collisions or consecutive collisions of reactant particles are required. Since multi-body simultaneous collisions are so improbable as to be practically non-existent intermediate compounds must be produced from the intermediate consecutive collisions. Thus a conglomeration of intermediate reaction products may be formed including contaminants which must subsequently be separated from the desired products. Also more than one useful product may be produced which would make segregation of products desirable.

SUMMARY OF INVENTION

It is an object of this invention to provide a vapor phase reactor or device for producing multicomponent compounds from normally solid or high boiling point reactants.

It is also an object to provide a vapor phase reactor or device which will produce a variety of segregated products in a single run.

It is also an object to provide a vapor phase reactor which will allow separation of contaminants from reactants and reaction products.

It is a further object to provide a vapor phase reactor for producing compounds which cannot be readily formed at temperatures obtainable in liquid phase.

Further objects will become apparent from the following detailed description and the most novel features will be particularly pointed out in the claims.

DESCRIPTION OF DRAWINGS

The present invention is described in the accompanying drawings wherein:

FIG. 1 is a cross-sectional elevation view of the vapor phase device or reactor;

FIG. 1a is a cross-sectional view of the crucible shown in FIG. 1;

FIG. 2 is a cross-sectional view cut through line 2—2 of FIG. 1;

FIG. 3 is a perspective view of an alternate form of a condensation probe included in the vapor phase reactor shown in FIG. 1; and FIG. 4 is a sectional view, partially in cross section, of a portion of the member shown in FIG. 3.

DETAILED DESCRIPTION

FIGS. 1 and 2 show an apparatus 10 for reacting high boiling or normally solid reactants in the vapor phase. The reactor 10 comprises a plurality of crucibles 28 located within vapor compartments 22 for containing the normally solid reactants, a heat source 50 for vaporizing the reactants, a reaction zone 34 where the reactants combine in vapor phase, a condensation probe 30 for solidifying the resulting reaction products, and a housing 11 which isolates the reaction from the atmosphere.

The atmospheric protection tube or housing 11 may be sealed at one end by end plate 13 having a plurality of small ports 15 each admitting a thermocouple positioning rod or conduit 17 fitted within a sealing means 16 (such as an O-ring) held within end plate 13 by retaining plate 14. Another conduit 19 may be fabricated within the end plate to permit entry of process fluids or carrier gas.

Housing 11 may contain, at the end adjacent but spaced from end plate 13, a plurality of vapor compartments or elongated tubes 22 which may be disposed parallel to the axis of housing 11 and to each other. The ends of vapor compartments 22 disposed towards end plate 13 may be open and supported by suitable packing 21 which fills the periphery defined by the outside surface of compartments 22 and the inside surface of housing 11. Packing 21 serves to direct most of the carrier gas flow from conduit 19 into the vapor compartments, but allows a fractional flow to pass through and sweep the periphery clean of back flowing reaction products. Housing 11 may include a smooth ground tapered joint or union 24 disposed proximately to packing 21 so that such packing and the vapor compartments 22 may be arranged within and removed from the housing. The opposite ends of vapor compartments 22 may be closed by arcuate or hemispheroidal portions having orifices or apertures 23 located therein such that the apertures' axes are oblique to the longitudinal axes of the vapor compartments. The vapor compartments may be rotatively aligned such that the apertures 23 generally face the longitudinal axis or center line of the housing 11. Accordingly, all apertures may be directed towards one another.

Intermediate vapor compartments 22 and entry conduits 19 may be a common gas chamber 25 for providing an equalization of carrier gas pressure into each of the vapor compartments. Flow surges from the carrier gas source as well as unequal flow distribution among the vapor compartments may consequently be minimized.

Each vapor compartment may contain a crucible 28 which is shown enlarged and in detail in FIG. 1a. A heavy metal vessel or heat reservoir 26, having a high heat capacity, thermal conductivity, and melting point supports and encompasses substantially all outside surfaces of an inner crucible 27. Such crucibles may hold the solid reactants for vaporization while the heavy metal vessel tends to equalize the temperature at all crucible surfaces. The thermocouple conduits 17 may be threaded, or otherwise attached into vessels 26 such that the thermocouple leads 18 for a junction 20 contiguous to the outside walls of inner crucible 27.

The condensation probe 30 (FIG. 1) having a diameter substantially smaller than that of housing 11 may be longitudinally partially enclosed therein. One end of said probe 30 may be a flat sealed end wall or collection plate 32 disposed adjacent but spaced apart from the rounded or arcuate ends of vapor compartments 22, thus defining a reaction zone 34 therebetween within housing 11. Support rack 36 may be adjacent but spaced from collection plate 32 so as to support the probe 30 within housing 11. At a point along the longitudinal axis of the condensation probe 30 spaced from the collection plate 32, the housing 11 diameter may decrease so as to approach but not meet the diameter of the condensation probe. The housing 11 may thereabouts terminate in a smooth ground tapered socket 42.

Condensation probe 30 may comprise an outer cylindrical tube 31 having the above described blunt or flat end wall constituting collection plate 32, an inner tube 33 which may be concentrically held within outer tube 31 by spaced apart supports 35 and may have an open end 37 adjacent to and directed towards but spaced from the collection plate 32. The opposite end of inner tube 33 may have a port or conduit 38 extending beyond the end of outer tube 31. Another port or conduit 39 may be included in the same end of outer tube 31 communicating with the peripheral passageway 29 between inner tube 33 and outer tube 31. Thus a coolant flow route or passageway is defined from port 38 into inner tube 33 and out the opposite open end 37 towards collection plate 32 into the peripheral passageway 29 to outlet port or conduit 39.

A coupling member 40 having a smooth tapered plug end 44 which mates with tapered socket 42 of the housing 11 may firmly attach condensation probe 30 to the housing 11. The opposite end of coupling member 40 may form a smooth tapered socket 46 which may be connected to a matching tapered plug 48 formed around the outside surface of condensation probe 30 at a location intermediate collection plate 32 and coolant port 39. Coupling member 40 may also include a port or conduit 43 for egress of carrier gas introduced at conduit 19 or for evacuation of the system.

The furnace of heat source 50, which may be an electrical resistance or radio frequency type heater, may encompass a generally central portion of atmospheric protection tube or housing 11. Vapor compartments 22 and condensation probe 30 may be partially encompassed thereby while reaction zone 34 may be completely surrounded by the heat source 50. A thermocouple unit 49 having conduit and leads may extend into the reaction zone at about the center of furnace 50 to monitor the highest temperatures reached within the housing.

The shapes and construction materials of the components generally need not be rigidly specified. All of the tubes, ports, and conduits may be cylindrical while the vessels and crucibles may be disk shaped or generally rectilinear. The housing, vapor compartment, and inner crucibles which are subjected to the highest temperatures may be constructed of a high melting point ceramic such as mullite ($3Al_2O_3 \cdot 2SiO_2$) or alumina ($Al_2O_3$) which are especially suitable materials for this high temperature service. The packing material 21 location outside the heat source and accordingly relatively cool, may be quartz wool. The condensation probe which also will be kept relatively cool by the coolant flow may likewise be of quartz. The vessels surrounding the inner crucibles may be of a high heat capacity metal such as tantalum (Ta) to equalize the temperature at the crucibles walls. The thermocouple leads and/or junctions may be of any materials which will sensitively respond to the operating temperatures. (I.e. for 1000° C. to 1600° C. a platinum to platinum-10% rhodium junction may be used.) The thermocouple conduits may be of any refractory material compatible with the high temperatures such as mullite while a furnace having a platinum resistance heater insulated by silica refractory may provide temperature to 1500° C.

After assembling the vapor phase reactor device operation may begin by evacuating the system through an outlet conduit such as 43 and/or by flushing with an inert gas to prevent undesirable reactions with air. A suitable vacuum grease may be applied to all ground tapered joints such as between 46 and 48 to insure hermetic sealing. The reactants, separately disposed in crucibles 28 are melted and vaporized by means of heat source 50. The rate of vaporization of each reactant may be monitored by the temperture response of thermocouple leads 18 and controlled by adjusting the position of the crucibles in relation to heat source 50 by sliding thermocouple positioning rods 17 longitudinally through ports 15 and O-ring 16 such that the crucible is repositioned as shown in at 28'. Moreover, by thus controlling the temperature of the reactants, high boiling impurities may be left within the crucibles after the reactant materials have vaporized. If desired an inert carrier gas such as argon may be introduced through port 19 to entrain the reactant vapors or gases through orifices or apertures 23 into reaction zone 34. The orifices may have been directed towards each other during assembly so as to cause the gas and/or vapor streams to converge and thoroughly mix within the reaction zone 34 (FIG. 2).

The temperature within the reaction zone 34 may be monitored with thermocouple 49 and controlled by regulating the heat source 50 temperature. This temperature should be held at least high enough to prevent premature condensation of reactants and as high as necessary to maintain the desired reaction.

By arrangement of the orifices 23 as described a finely divided vapor solution of the reactants may be formed. If reaction does not occur or is not complete, a finely divided solid solution of the reactants will be deposited on the collection plate 32.

In some cases several reactions may take place which give rise to a variety of reaction products having a broad range of boiling points. If such a mixture of reaction products and unreacted reactants is produced, fractional condensation or solidification may occur which would leave the high boiling products deposited on the collection plate 32 and the lower temperature boilers deposited around condensation probe 30 at cooler points more remote from the heat source 50 center. To control the products formed and their location on condensation probe 30, its longitudinal relationship to the temperature gradient existing between the heat source 50 center and extremities may be varied through use of several condensation probes 30 or several coupling members 40 having differing lengths. Also tapered plug 48 may be slideably connected to the outside circumference of condensation probe 30 (not illustrated) for longitudinal adjustment. Addition temperature control of the condensation probe may be accomplished by regulating the rate of coolant flow. These methods of condensation temperature control may not only be used to effect segregation of products but may also be used to purify the products by allowing contaminants to escape with the carrier gas in vapor phase.

A fluid such as water or nitrogen gas may be circulated as a coolant into port 38, through the condensation probe 30 and out port 39 or in the reverse manner. Since the coolant temperature would generally be considerably lower than the solidification temperature of the reaction products, such products will normally crystallize or solidify on the condensation probe and must be scraped off after disassembly. If fractional solidification has occurred the various products may be separately scraped from the probe. If desired a liquid coolant capable of sustaining higher temperatures than water such as liquid sodium-potassium salts may be used so that the products formed would be in the liquid state and may be continuously removed.

The carrier gas, gas phase contaminants, and/or residual reactants may be withdrawn through conduit 43 by a suitable vacuum or pumping means (not shown) and if desired recycled to port 19. Of course, if the reactor is operated at above atmospheric pressure and no recycle is desired, port 43 may be vented to the atmosphere with safety precautions consistent with the temperature and composition of the gases.

An alternate form of condensation probe is shown in FIG. 3. The probe may have both an outer tube 51 and an inner tube 53 forming a coolant flow route as described in conjunction with FIG. 1. However, a plurality of laterally projecting collection plates or disks 55 may be concentric with and spaced longitudinally along the condensation probe. These plates may be disk shaped or otherwise, of varying or equal sizes and composed of the same or different material as the outer probe tube 51 (i.e. quartz). These collection plates may be solid or hollow so as to allow coolant circulation therein. This form of condensation probe may be especially useful where fractional condensation is desired to recover a variety of segregated products. Ideally a separate product will solidify on each collection plate.

FIGURE 4 shows a method of forming the collection plates 55 to permit internal coolant circulation. The outer probe tube 51 may be interrupted between the radial walls of hollow collection disk 55. A radial barrier or circular wall 57 may be located intermediate and spaced from the radial walls of disk 55 and may extend from inner probe tube 53 to a location spaced from the circular peripheral wall 61 of disk 55. Thus a coolant flow passageway may be defined from the corridor between tubes 51 and 53 over and around the circular barrier 57 back into tube 51. As a further modification the inlet and outlet coolant ports 38 and 39 of the condensation probe may be reversed from the manner described in conjunction with FIG. 1 so that lower temperature coolant will flow through the collection disks farthest removed from the reaction zone.

EXAMPLE

A 4" diameter by 36" long housing containing three 1½" diameter by 12" vapor compartments and a 24" long condensation probe was centrally encompassed by a 2 kw. resistance heater. About 5 grams each of cadminum (Cd), zinc (Zn), and sulfur (S) were disposed in separate 10 ml. crucibles supported by 1 cubic inch tantalum vessels. The temperature was raised to 1200° C. in the center of the reaction zone with an argon carrier gas flow of about ½ c.f.m. flowing through the system. About 250–300 c.f.h. of nitrogen gas was circulated through the condensation probe as a coolant while the reaction was conducted. After about 60 minutes of operation most of the reactants were vaporized and the furnace was turned off to allow the reactor to cool before disassembling and recovering the products. By spectrographic analysis it was found that about 1 gm. CdZnS was produced.

The apparatus and method of this invention provide a vapor phase reactor which will produce multicomponent compounds from starting reactants which are normally solid at ambient conditions. Furthermore, some of these compounds such as cadminum zinc sulfide could not be prepared at temperatures low enough to allow liquid phase reactions. Such compounds are useful for forming solid state electronic components such as semiconductors and transistors. Furthermore, this vapor phase reactor allows production of a variety of segregated products in a single run by means of fractional condensation or solidification. Also contaminants may be separated from the reactants and the reaction products by temperature monitoring and control of boiling reactants and condensing or solidifying products.

It will be understood that various changes in the details, materials, and arrangements of the parts described to explain the invention may be made by those skilled in the art within the scope of the invention as expressed in the appended claims.

What is claimed is:

1. Means for production of compounds from normally solid reactants comprising a housing, a plurality of vapor compartments adjacent each other within said housing each having an end portion with an aperture therein adjacent a common location, a crucible for containing a reactant material disposed within each of said vapor compartments, a condensation probe having a collection plate disposed within said housing and spaced from said end portions defining a reaction zone in said space, means extending about said housing for heating said reaction zone and at least a portion of said vapor compartments including said crucibles, conduit means for conducting gas to said vapor compartments for flow through said vapor compartments and apertures and reaction zone to said condensation probe, and conduit means for removing gas from said reaction zone subsequent a flow therethrough and past said collection plate of the condensation probe.

2. The device according to claim 1 wherein said condensation probe includes a plurality of laterally projecting collection plates spaced along said condensation probe.

3. The device according to claim 2 wherein said laterally projecting collection plates include an internal passageway for coolant flow.

4. The device according to claim 1 wherein said collection plate is selectively positionable towards and away from said vapor compartments.

5. The device as claimed in claim 1, wherein there is provided a common gas chamber intermediate said first-mentioned conduit means and said plurality of vapor compartments.

6. The device according to claim 1 wherein said vapor compartments are rotatable about their axes for directional control of said gas flow through said apertures.

7. The device according to claim 1 wherein said crucibles are supported by longitudinally slideable rods for selectively positioning said crucibles in relation to said vapor compartments.

8. The device according to claim 1 wherein said crucibles are encompassed within metal heat reservoirs having high heat capacity and thermal conductivity for equalizing temperature about the crucible surface, and means is provided for sensing reactant temperature.

9. The device according to claim 1 wherein said housing and vapor compartments are composed of a ceramic selected from the group consisting of mullite and alumina.

References Cited

UNITED STATES PATENTS 3,421,952   1/1969   Conrad et al. _____ 148—175

OTHER REFERENCES

IBM Tech. Disclosure Bulletin, vol. 4, No. 5, October 1961, pp. 47, 48.

IBM Tech. Disclosure Bulletin, vol. 9, No. 5, October 1966, pp. 525, 526.

MORRIS O. WOLK, Primary Examiner

D. G. MILLMAN, Assistant Examiner

U.S. Cl. X.R.

23—134, 252; 117—107.2, 201; 118—49.1; 148—174